United States Patent

Calame et al.

[15] 3,666,780

[45] May 30, 1972

[54] ALKYLIDENE AND HYDROXY OR ACETOXY SUBSTITUTED ALIPHATIC CARBOXYLIC ACIDS AND ESTERS USEFUL IN INSECT CONTROL

[72] Inventors: Jean Pierre Calame, Fallanden, Switzerland; John B. Siddall, Palo Alto, Calif.

[73] Assignee: Zoecon Corporation, Palo Alto, Calif.

[22] Filed: Jan. 27, 1970

[21] Appl. No.: 6,292

Related U.S. Application Data

[63] Continuation-in-part of Ser. No. 666,484, Sept. 8, 1967, abandoned.

[52] U.S. Cl. ..........................260/405, 260/410.9, 260/413, 260/247, 260/247.2 A, 260/247.2 B, 260/247.7 R, 260/247.7 A, 260/247.7 C, 260/247.7 G, 260/268 R, 260/268 C, 260/293.67, 260/293.86, 260/293.88, 260/293.9, 260/326.3, 260/326.5 R, 260/326.5 E, 260/487, 260/488 R, 260/488 F, 260/488 J, 260/488 H, 260/514 P, 260/557 R, 260/576, 260/577, 260/583 R, 260/583 G, 260/583 H, 260/584 R, 260/584 C, 260/614 R, 260/615 R, 260/632 R, 260/635 R, 260/961, 424/312, 424/318, 260/326.8, 260/345.8, 260/345.9, 260/347.4, 260/347.8, 260/348 R, 260/348 A, 260/404, 260/408, 260/410.6, 260/468 R, 260/468 B, 260/468 P, 260/471 R, 260/473 C, 260/476 R, 260/484 R, 260/485 R, 260/485 G, 260/485 N, 260/485 P, 260/486 R

[51] Int. Cl. ..................C07c 59/18, C07c 69/66, A01n 9/24

[58] Field of Search ..........................260/410.9 R, 405, 413

[56] References Cited

FOREIGN PATENTS OR APPLICATIONS 1,043,307   11/1958   Germany

*Primary Examiner*—Lewis Gotts
*Assistant Examiner*—Diana G. Rivers
*Attorney*—Donald W. Erickson

[57] ABSTRACT

Hydrocarbon carboxylic acids, esters, alcohols and ethers containing from 12 to 17 carbon atoms in the hydrocarbon backbone chain and alkyl or alkylidene substituents at the C-7 and C-11 and/or double bond unsaturation between C-2,3 and/or C-5,6 or C-6,7 or C-7,8 and/or C-9,10 or C-10,11 or C-12,13 and/or fused groupings bridging positions C-2,3, C-6,7, C-10,11 are useful arthropod maturation inhibitors.

25 Claims, No Drawings

ALKYLIDENE AND HYDROXY OR ACETOXY SUBSTITUTED ALIPHATIC CARBOXYLIC ACIDS AND ESTERS USEFUL IN INSECT CONTROL

This is a continuation-in-part of application Serial No. 666,484, filed Sept. 8, 1967, now abandoned.

The present invention relates to novel organic compounds useful in the control of arthropod population and to processes for their preparation.

More specifically, the present invention pertains to certain mono-, di- or tri-unsaturated compounds that inhibit maturation of arthropods and to the processes for the preparation of such compounds. The compounds of the present invention can be represented by the following structural formulas:

$$R^4-[A]-CH_2-CH_2-\underset{\underset{Z^7}{|}}{\overset{\overset{CH_2R^2}{|}}{C}}-HC=CH-CH_2-\underset{\underset{Z^3\ Z^2}{|\ |}}{\overset{\overset{CH_2R^1}{|}}{C}}-CH-R^{10}$$
(I)

$$R^4-CH_2-\underset{\underset{Z^{11}}{|}}{\overset{\overset{CH_2R^3}{|}}{C}}-HC=CH-[B]-CH_2-CH_2-\underset{\underset{Z^3\ Z^2}{|\ |}}{\overset{\overset{CH_2R^1}{|}}{C}}-CH-R^{10}$$
(II)

$$R^4-CH_2-\underset{\underset{Z^{11}}{|}}{\overset{\overset{CH_2R^3}{|}}{C}}-CH=CH-CH_2-\underset{\underset{Z^7}{|}}{\overset{\overset{CH_2R^2}{|}}{C}}-CH=CH-CH_2-\underset{\underset{Z^3\ Z^2}{|\ |}}{\overset{\overset{CH_2R^1}{|}}{C}}-CH-R^{10}$$
(III)

$$R^4-[A]-CH_2-[D]-CH_2-CH_2-\underset{\underset{Z^3\ Z^2}{|\ |}}{\overset{\overset{CH_2R^1}{|}}{C}}-CH-R^{10}$$
(IV)

$$R^4-[C]-CH_2-[B]-CH_2-CH_2-\underset{\underset{Z^3\ Z^2}{|\ |}}{\overset{\overset{CH_2R^1}{|}}{C}}-CH-R^{10}$$
(V)

wherein [A] is one of the group $$-HC=\underset{\underset{W^{10'}}{|}}{\overset{\overset{CH_2R^3}{|}}{C}}-CH-,\quad -CH_2-\underset{\underset{W^{10'}}{|}}{\overset{\overset{CHR^3}{\|}}{C}}-CH-,$$

or $$-CH_2-\underset{\underset{W^{11}}{|}}{\overset{\overset{CH_2R^3}{|}}{C}}-\underset{\underset{W^{10}}{|}}{CH}-;$$

[B] is one of the group $$-CH=\underset{\underset{W^{6'}}{|}}{\overset{\overset{CH_2R^2}{|}}{C}}-CH-,\quad -CH_2-\underset{\underset{W^{6'}}{|}}{\overset{\overset{CHR^2}{\|}}{C}}-CH-,$$

or $$-CH_2-\underset{\underset{W^7\ \ W^6}{|\ \ \ |}}{\overset{\overset{CH_2R^2}{|}}{C}}-CH-;$$

[C] is one of the group $$-CH=\underset{\underset{W^{10'}}{|}}{\overset{\overset{CH_2R^3}{|}}{C}}-CH-\ \text{or}\ -CH_2-\underset{\underset{W^{10'}}{|}}{\overset{\overset{CHR^3}{\|}}{C}}-CH-;$$

[D] is one of the group $$-CH=\underset{\underset{W^{6'}}{|}}{\overset{\overset{CH_2R^2}{|}}{C}}-CH-\ \text{or}\ -CH_2-\underset{\underset{W^{6'}}{|}}{\overset{\overset{CHR^2}{\|}}{C}}-CH-;$$

each of
$R^1$, $R^2$, $R^3$ and $R^4$ is hydrogen or (lower) alkyl;

$R^{10}$ is the group $COOR^{11}$, $CH_2R^{12}$, $CONR^{13}R_{14}$, $CH_2NR^{13}R^{14}$, or $CH_2PO(OR^{15})_2$;

$R^{11}$ is hydrogen, (lower)alkyl or an alkali metal cation;

$R^{12}$ is hydroxy, a conventional hydrolyzable ether group, or a conventional hydrolyzable ester group;

each of $R^{13}$ and $R^{14}$ is hydrogen, (lower)alkyl, (lower)hydroxyalkyl, (lower)alkoxyalkyl, or phenyl;

$R^{13}$ and $R^{14}$ taken ogether with the nitrogen atom to which they are attached are pyrrolidino, piperidino, piperazino, morpholino, or a 4'-(lower)alkyl piperazino group;

each of $R^{15}$ is (lower)alkyl;

each of $Z^2$ and $Z^3$ is hydrogen;

each of $W^6$ and $W^{10}$ is hydrogen or hydroxy;

each of $W^{6'}$, $W^7$, $W^{10'}$ and $W^{11}$ is hydrogen, hydroxy, a conventional hydrolyzable ether group, or a conventional hydrolyzable ester group;

$W^6$ is hydrogen when $W^7$ is hydrogen, $W^{10}$ is hydrogen when $W^{11}$ is hydrogen;

each of $Z^7$ and $Z^{11}$ is hydroxy, a conventional hydrolyzable ether group, or a conventional hydrolyzable ester group;

$Z^2$ and $Z^3$ when taken together are a carbon-carbon double bond, or one of the group $$\diagdown\!\!\!\!\diagup\!\!\!\!O\ \text{or}\ \diagdown\!\!\!\!\diagup\!\!\!\!CH_2;$$

$W^6$ and $W^7$ when taken together are a carbon-carbon double bond, or one of the following group $$\diagdown\!\!\!\!\diagup\!\!\!\!O,\ \diagdown\!\!\!\!\diagup\!\!\!\!CH_2,$$

$$\diagdown\!\!\!\!\diagup\!\!\!\!CF_2,\ \text{or}\ \diagdown\!\!\!\!\diagup\!\!\!\!CCl_2;$$

$W^{10}$ and $W^{11}$ when taken together are a carbon-carbon double bond, or one of the group $$\diagdown\!\!\!\!\diagup\!\!\!\!O,\ \diagdown\!\!\!\!\diagup\!\!\!\!CH_2,\ \diagdown\!\!\!\!\diagup\!\!\!\!CF_2,$$

$$\text{or}\ \diagdown\!\!\!\!\diagup\!\!\!\!CCl_2;$$

and the conventional acid addition salts of the amines.

In order to facilitate the description of the present invention, the carbon atoms in the above formulas are numbered from right to left from C-2 to C-12. The initial carbon atom of $R^{10}$ is C-1. The three carbons above the backbone and connected to the backbone at C-3, C-7 and C-11 and the R groups $R^1$, $R^2$ and $R^3$ respectively are numbered C-3′, C-7′ and C-11′ respectively from right to left. The backbone of the present novel unsaturated compounds is the carbon atom chain made up of carbon atoms C-1 through C-12, including C-11′. Thus, in the above formulas, $R^1$ is bonded to the C-3′ carbon atom, which in turn is bonded to the C-3 carbon atom of the backbone of the present novel unsaturated compounds. $R^2$ is bonded to the C-7′ carbon atom, which in turn is bonded to the C-7 carbon atom, which in turn is bonded to the C-6 carbon atom on its right and the C-8 carbond atom on its left.

Included within the scope of the present compounds of formula I are carboxylic acids and the esters and alkali metal cations thereof ($R^{10}$ being $COOR^{11}$, where $R^{11}$ is hydrogen, alkyl, or alkali metal cations); alcohols and the esters and ethers thereof ($R^{10}$ being $CH_2R^{12}$, where $R^{12}$ is hydroxy, or conventional ether or ester groups, and the like); unsubstituted amides ($R^{10}$ being $CONR^{13}R^{14}$, where $R^{13} = R^{14} =$ hydrogen); monosubstituted amides ($R^{10}$ being $CONR^{13}R^{14}$, where $R^{13} =$ hydrogen and $R^{14}$ is other than hydrogen); disubstituted amides ($R^{10}$ being $CONR^{13}R^{14}$, where $R^{13}$ and $R^{14}$ are both other than hydrogen); primary amines ($R^{10}$ being $CH_2NR^{13}R^{14}$, where each of $R^{13}$ and $R^{14}$ is hydrogen); secondary amines ($R^{10}$ being $CH_2NR^{13}R^{14}$, where $R^{10}$ is hydrogen and $R^{11}$ is other than hydrogen); tertiary amines ($R^{10}$ being $CH_2NR^{13}R^{14}$, where $R^{13}$ and $R^{14}$ are both other than hydrogen); and dialkyl phosphonates ($R^{10}$ being $CH_2PO(OR^{15})_2$, where $R^{15}$ is (lower) alkyl.

Also intended to be included within the scope of the present invention are the above represented compounds which contain esterified and etherified hydroxyl groups.

The chain length of the backbone of the present novel unsaturated compounds is from 12 carbon atoms (where $R^3$ and $R^4$ are hydrogen) to 17 carbon atoms (where $R^3$ is n-pentyl and/or $R^4$ is n-pentyl).

The C-3 carbon atom is substituted with a (lower) alkyl group ($-CH_2-R'$). The C-7 carbon atom is substituted either with a (lower)alkyl group ($-CH_2R^2$) or a (lower) alkylidene group ($=CH-R^2$). The C-11 carbon atom is substituted with either two (lower)alkyl groups ($-CH_2R^3$ and $-CH_2R^4$) or with one (lower)alkyl group and one (lower)alkylidene group ($=CH-R^3$ and $-CH_2R^4$, or $-CH_2R^3$ and $=CH-R^4$).

In addition, the C-6, C-7, C-10 and C-11 carbon atoms, independently, are optionally substituted with groups ($W^6$, $W^{6'}$, $W^7$, $Z^7$, $W^{10}$, $W^{10'}$, $W^{11}$ and $Z^{11}$) other than hydrogen, such as hydroxy groups.

Each of the pairs of carbon atoms C-2,3; C-5,6, or C-6,7 or C-7,8; and C-9,10 or C-10,11 or C-11,12 are bonded together by a carbon-carbon single bond or a double bond. Optionally, the pairs of carbon atoms C-2,3; C-6,7 and C-10,11 can be bridged by a fused grouping, such as oxido, methylene, dichloromethylene, or difluoromethylene.

Obviously a carbon atom in the present novel unsaturated compounds is bonded only to one other carbon atom by a double bond or a fused grouping. For example, when the C-7 carbon atom is bonded to the C-6carbon atom by a carbon-carbon double bond, the C-7 carbon atom is bonded to the C-7' and C-8 carbon atoms by carbon-carbon single bonds.

The presence of double bonds and fused groupings gives rise to geometric isomerism in the configuration of these compounds. This isomerism occurs with regard to the double bond or fused grouping bridging the C-2,3 carbon atoms, the C-6,7 carbon atoms, and the C-10,11 carbon atoms, or to the double bond bonding the C-5,6 or the C-7,8 or C-7,7' carbon atoms and the C-9,10 or the C-11,11' or the C-11,12 carbon atoms. Obviously such isomerism only occur with respect to the C-7,7' carbon atoms when $R^2$ is (lower)alkyl and to the C-11,11' carbon atoms when $R^3$ is (lower)alkyl, and to the C-11,12 carbon atoms when $R^4$ is (lower)alkyl, and to the C-10,11 carbon atoms when $R^3$ and $R^4$ are different groups.

The isomers are the cis and trans of the monoene or single fused grouping series; the cis, cis; cis, trans; trans, cis; and trans, trans of the diene or bis fused grouping series, or combinations thereof, and the eight isomers of the triene or tris fused grouping series, or combinations thereof, each of which isomers in each series being included within the scope of this invention. Each of these isomers is separable from the reaction mixture by which they are prepared by conventional techniques known to the art, such as chromatography, including thin-layer, gas-liquid and column chromatography, and the like.

The term "(lower)alkoxy" denotes a group comprising a straight chain aliphatic hydrocarbon of from one to five carbon atoms with an oxygen atom bonded to the C-1carbon atom. Typical of such (lower)alkoxy are methoxy, ethoxy, 1-propoxy, 1-butoxy, and the like.

The term "alkyl" denotes a group comprising a straight or branch chain aliphatic hydrocarbon of from one to 12 carbon atoms. Typical of such alkyl are methyl, ethyl, isopropyl, propyl, butyl, pentyl, hexyl, octyl, and the like. When qualified by the term "(lower)", such a group will contain no more than five carbon atoms. Typical of such (lower) alkyl are methyl, ethyl, isopropyl, propyl, isobutyl, butyl, soc-butyl, t-butyl, pentyl, and the like.

The term "(lower)alkylidene" denotes a group comprising a straight or branched chain aliphatic hydrocarbon of from one to six carbon atoms wherein the group is attached by a carbon-carbon double bond. Typical of such alkylidene are methylene, ethylidene, 1-propylidene, 1-butylidene, 2-propylidene, 1-pentylidene, 3-pentylidene, 1-hexylidene, and the like.

The term "(lower)hydroxyalkyl" denotes a group comprising a straight or branched chain aliphatic hydrocarbon of from one to six carbon atoms substituted with one or two hydroxy groups. Typical of such (lower)hydroxyalkyl are hydroxymethyl, β-hydroxyethyl, 6-hydroxyhexyl, and the like.

The term "(lower)alkoxyalkyl" denotes a group comprising a straight or branched chain aliphatic hydrocarbon of from one to eight carbon atoms substituted with an alkoxy group of from one to eight carbon atoms. Typical of such (lower)alkoxy-alkyl are methoxymethyl, 2-ethoxyethyl, 3-methoxypropyl, 3-ethoxypropyl, and the like.

The term "conventional hydrolyzable ester" as used herein denotes those hydrolyzable ester groups conventionally employed in the art, preferably those derived from hydrocarbon carboxylic acids. The term "hydrocarbon carboxylic acid" defines both substituted and unsubstituted hydrocarbon carboxylic acids. These acids can be completely saturated or possess varying degrees of unsaturation (including aromatic), can be of straight chain, branched chain, or cyclic structure, and preferably contain from one to 12 carbon atoms. In addition, they can be substituted by functional groups, for example, hydroxy, alkoxy containing up to six carbon atoms, acyloxy containing up to 12 carbon atoms, nitro, amino, halogeno, and the like, attached to the hydrocarbon chain. Typical conventional hydrolyzable esters thus included within the scope of the term and the instant invention are formate, acetate, propionate, butyrate, valerate, caproate, enanthate, caprylate, pelargonate, acrylate, undecenoate, phenoxyacetate, benzoate, phenylacetate, diphenylacetate, diethylacetate, trimethylacetate, t-butylacetate, trimethylhexanoate, methylneopentylacetate, cyclohexylacetate, cyclopentylpropionate, adamantoate, glycolate, methoxyacetate, hemisuccinate, hemiadipate, hemi-β, β-dimethylglutarate, acetoxyacetate, 2-chloro- 4-nitrobenzoate, aminoacetate, diethylaminoacetate, piperidinoacetate, β-chloropropionate, trichloroacetate, β-chlorobutyrate, and the like.

The term "conventional hydrolyzable ether" as used herein denotes those hydrolyzable ether groups conventionally employed in the art, preferably those derived from normal, branched chain and cyclic hydrocarbons and aromatic hydrocarbons. The term "hydrocarbon" defines both substituted and unsubstituted hydrocarbons. Typical substituted groups include hydroxy, alkoxy containing up to six carbon atoms, acyloxy containing up to 12 carbon atoms, nitro, amino, halo, keto, and the like. These hydrocarbons (except for the aromatic hydrocarbons) can be completely saturated or possess (including aromatic hydrocarbons) varying degrees of unsaturation. Preferably they contain from one to 12 carbon atoms. Typical conventional hydrolyzable ethers thus include methoxy, ethoxy, propoxy, 2-propoxy, cyclopropoxy, butoxy, 2-butoxy, t-butoxy, cyclobutoxy, pentoxy, 3-pentoxy, cyclopentoxy, hexoxy, cyclohexoxy, methylmethylenedioxy, 2-methoxyethoxy, 2-ethoxyethoxy, 2-aminoethoxy, 2-chloroethoxy, 3-fluoro-butoxy, 2-acetoxyethoxy, 3-nitropropoxy, 3-aminocyclobutoxy, 4-hexylcyclohexoxy, 2- phenoxyethoxy, phenoxy, tolyloxy, chlorophenoxy, m,m'-dimethylphenoxy, penitrophenoxy, β-chloropropoxy, p-aminophenoxy, tetrahydrofuran-2'-yloxy, tetrahydropyran-2'-yloxy, and the like.

The compounds of this invention are arthropod maturation inhibitors. They possess the ability to inhibit the maturation of members of the phylum Arthropoda, particularly members of the class Insecta, in the passage from one metamorphic stage to the next metamorphic stage. Thus, in the case of insects passing from the embryo stage to the larva stage, thence to the pupa stage, and thence to the adult stage, contact with an effective amount of a compound of the present invention, at any of the first three stages, inhibits passage to the next developmental stage with the insect either repeating passage through its present stage or expiring. Accordingly, these present novel unsaturated compounds are useful in arthropod population control.

Moreover, these compounds exhibit ovicidal properties with insects, and accordingly are useful in combating insects. These compounds are very potent and thus can be used at extremely low levels, e.g. from $10^{-6}$ to $10^{-9}$ g. and thus are advantageously administered over large areas in quantities suitable for the estimated insect population. Generally the substances are liquids and for the purposes herein described, they can be utilized in conjunction with liquid or solid carriers. Typical insects against which these compounds are effective include mealworm, housefly, bollweevil, cornborer, mosquito, cockroach, moth, pyrrhocoris beetle, and the like.

Although not intending to be limited by any theoretical explanation, it appears that the effectiveness of these derivatives can be traced to their ability to mimic the activity of certain so-called "juvenile hormone" substances such as those described in U.S. Pat. No. 2,981,655 and Law et al., *Proc. Nat. Acad. Sci.*, 55,576 (1966). Because of the potency of the compounds of the present invention, they can be employed in extremely low concentrations, as noted above, to obtain reproducible predetermined levels of activities.

The novel compounds of the present application may be prepared chemically according to a number of alternative chemical processes.

By one such process the present compounds are prepared from the corresponding starting halo compounds by the dehydrohalogenation of the latter. Thus, for example, the compound of formula (III) are prepared from the corresponding starting halo compound where the C-6 carbon and the C-10 atoms are each substituted with a halo group, preferably chloro or bromo.

This dehydrohalogenation process can be shown schematically by the following reaction sequence using partial structure:

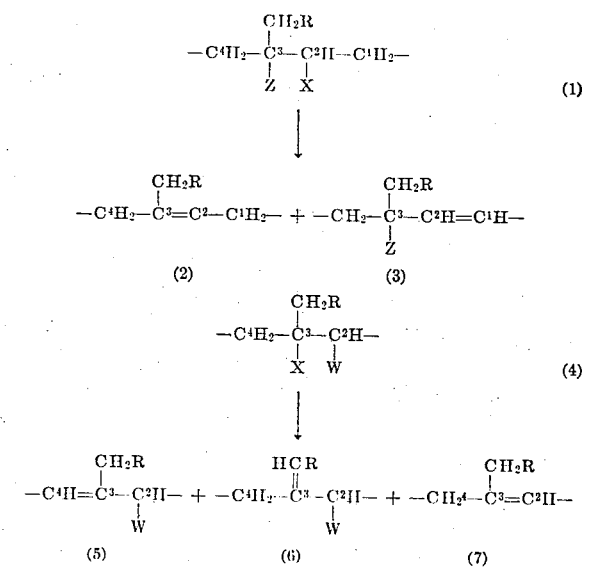

where C, $C^1$, $C_2$, $C^3$ and $C^4$ represent the C-7', C-5, C-6, C-7 and C-8 carbon atoms respectively, or the C-11', C-9, C-10, C-11 and C-12 carbon atoms respectively; R represents $R^2$ or $R^3$; Z represents $Z^7$ or $Z^{11}$; W represents $W^6$ or $W^{6'}$ or $W^{10}$ or $W^{10'}$; and X represents halo, preferably chloro or bromo.

When Z is other than hydrogen (i.e. when Z is a conventional ether grouping, or the like), the partial structure of formula (2) is not obtained by the present dehydrohalogenation process. When W is other than hydrogen (i.e. when W is a conventional ester grouping, or the like) atomic grouping (7) is not obtained by the present dehydrohalogenation process.

In the situation where the starting halo compound has a halo group substituted at the C-6 or C-10 carbon atoms, the double bond of the novel unsaturated compound that is obtained by the dehydrohalogenation process can be positioned in either of two positions. That is, for a starting halo compound with a halo group substituted to the C-10 carbon atom, a compound unsaturated between the C-9,10 carbon atoms and a compound unsaturated between C-10,11 (where the C-11 carbon atom of the starting halo material was unsubstituted) are obtained by the dehydrohalogenation process. Likewise, two unsaturated compounds can be obtained from a starting halo compound where the C-6 carbon atom is substituted with a halo group.

In the situation where the starting halo compound has a halo group substituted to the C-7 or C-11 carbon atoms, the double bond of the novel unsaturated compound that is obtained by the dehydrohalogenation process can be positioned in either or three positions. That is, for a starting halo compound with a halo group substituted at the C-7 carbon atom, a compound unsaturated at C-7,8, a compound unsaturated at C-7,7', and a compound unsaturated at C-7,6 (where the C-6 carbon atom of the starting material was unsubstituted) are obtained by the dehydrohalogenation process. Likewise, three unsaturated compounds can be obtained from a halo starting compound where the C-11 carbon atom is substituted with a halo compound.

The process for preparing the novel unsaturated compounds of formula (III) can be illustrated by the following reaction sequence:

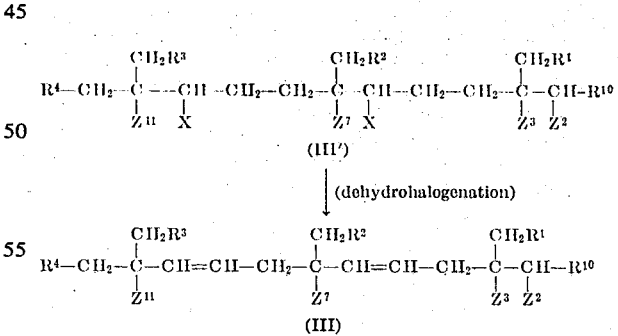

where $R^1 - R^4$, $R^{10}$, X, $Z^2$, $Z^3$, $Z^7$ and $z^{11}$ are as defined above.

Likewise, the novel compounds of formulas (I), (II), (IV) and (V) are prepared from the corresponding starting halo compound.

The present compounds are prepared by treating the appropriate starting halo compound with a basic reagent; for example, a tertiary amine such as triethyl amine, pyridine, quinoline, 1,5-diazabicyclo[4,3,0]non-5-ene, 1,5-diazabicyclo[4,4,0]dec-5-ene; an alkali metal lower alkoxide, such as sodium methoxide, potassium methoxide, sodium ethoxide, potassium ethoxide, potassium t-butoxide; and alkali metal hydroxide, such as sodium hydroxide, potassium hydroxide; an alkali metal carbonate, such as sodium carbonate, potassium carbonate, lithium carbonate; an alkali halide, such as lithium chloride, lithium bromide; and the like. Preferably a tertiary amine or an alkali metal carbonate is employed.

When the dehydrohalogenation is performed with a tertiary amine, the amine is often also employed as the sole solvent. Optionally, a non-aqueous inert organic co-solvent can be used. Typical co-solvents include hydrocarbons such as n-hexane, n-heptane, iso-octane, cyclohexane, benzene, toluene, xylene; lower alkanols such as methanol, ethanol, 2-propanol, t-butanol; ethers such as diethylether, dibutyl-ether, tetrahydrofuran, dioxane, 2,2'-dimethoxydiethylene-glycol, 1,2-dimethoxyethane, 1,2-di(2'-methoxyethoxy)ethane; and the like.

When the dehydrohalogenation is carried out employing an alkali metal carbonate or an alkali metal halide as a reagent, an ether, such as the ones described above, or an N,N-dialkyl hydrocarbon carboxylic acid amide, such as dimethylformamide, dimethylacetamide, and the like, is employed as a solvent. Optionally, mixtures of such solvents can be employed. When the alkali metal hydride is employed in an ether solvent, at least a molar equivalent of an alkali metal carbonate is concomitantly employed to prevent the reaction media from becoming acidic.

When the dehydrohalogenation is carried out with an alkali metal lower alkanol as the basic reagent, a lower alkanol, such as the ones described above, or a hydrocarbon such as the ones described above, is employed as a solvent. Mixtures of such solvents are also employed.

At least a molar equivalent of the basic reagent, and preferably 5 or more molar equivalents of the basic reagent, are used for every molar equivalent of halogen present on the starting halo compound. There is no limit as to the amount of excess basic reagent that can be employed, but economic considerations will generally dictate a practical upper limit.

The dehydrohalogenation is carried out at temperatures of from about -10°C. to about 150°C., conveniently at the reflux temperature of the reaction mixture. For example, when 1,5-diazabicyclo[4,3,0]non-5-ene, and the like, is employed as a dehydrohalogenating agent, the reaction temperature employed is the reflux temperature of the reaction mixture comprising of the reagent, the starting halo compound, and the solvent or solvent mixture. The reaction period varies, it is dependent upon the reaction temperature, reagents and starting halo compound, but usually it is from about 1 hour to about 72 hours. The dehydrohalogenation is performed under non-aqueous, preferably anhydrous, conditions.

Hydroxy groups α to the chloro or bromo groups are protected prior to the above process by etherification, esterification, of the like. If the hydroxy group in the chlorohydrin or bromohydrin starting halo compound is not protected, an oxido group bridging the carbon atoms that contained the chloro or bromo group and the hydroxy group, is obtained as a product of the above dehydrohalogenation process. After the dehydrohalogenation process, the ether and/or ester groups can be hydrolyzed to obtain the free hydroxy groups.

The novel compounds of the present invention are isolated from the reaction mixture by conventional techniques. For example, the reaction mixture is evaporated to one-third of its original volume and an equal volume of an inert organic solvent immiscible with water, such as methylene chloride, is added. The mixture is washed to neutrality and evaporated.

The reaction product contains usually one or more compounds. For example, as explained above, a compound unsaturated at the C-10,11 carbon atoms, a compound unsaturated at the C-11,11' carbon atoms and a compound unsaturated at the C-11,12 carbon atoms can be obtained by employing a halo starting compound containing a halo group at the C-11 position in the above dehydrohalogenating processes. These compounds are separated by techniques well-known to the art as, for example, distillation and chromatography, including gas-liquid chromatography, column chromatography and thin-layer chromatography.

The compounds are used both as individual compounds or as mixtures of two or more compounds. Thus, the reaction product is often unseparated and utilized as a mixture in arthropoda population control.

The starting halo compounds are prepared according to the procedures described in co-pending U.S. Pat. applications:
618,321 filed Feb. 24, 1967,
618,339 filed Feb. 24, 1967, and
618,351 filed Feb. 24, 1967, each now abandoned.

The starting halo compounds are prepared from the corresponding 2,6,10-trienes of the following formula:

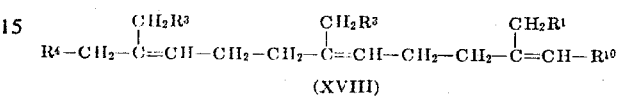

(XVIII)

wherein $R^1 - R^4$ and $R^{10}$ are as defined hereinbefore. Several of the trienes of formula (XVIII) are known; the other trienes can be prepared according to the processes disclosed in the above cited co-pending applications. For example, the above trienes are prepared from the appropriate ketones by a series of Wittig reactions which can be illustrated by the following reaction scheme:

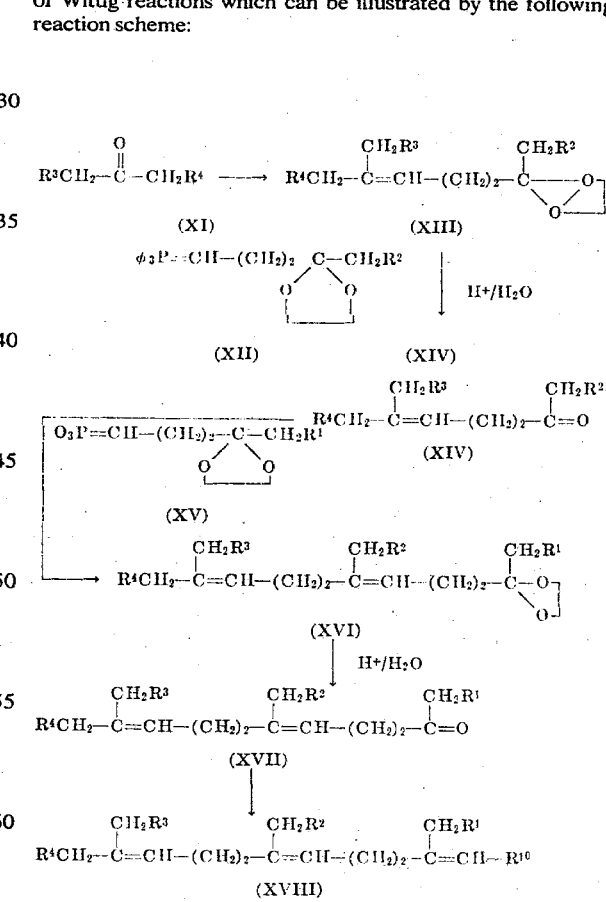

In the above scheme, each of $R^1$, $R^2$, $R^3$, $R^4$ and $R^{10}$ is as hereinbefore defined, and the symbol φ represents the phenyl group.

With reference to the above reaction scheme, the selected dialkylketone (XI) is permitted to react with the Wittig reagent derivative of formula (XII) to afford the corresponding substituted Wittig reaction adduct of formula (XIII).

Hydrolysis of the Wittig reaction adduct (XIII) with aqueous acid affords the free ketone (XIV). This ketone is allowed to react with the Wittig reagent (XV), affording the corresponding ethylene ketal diene adduct (XVI). The latter is hydrolyzed with aqueous acid to the tetraalkyl substituted dienone (XVII).

The Wittig reagents (XII) and (XV) are prepared by conventional procedures, such as is disclosed by Trippett, *Advances in Organic Chemistry*, Vol. 1, pp. 83–102, from the appropriate corresponding 4-ethylene ketal upon treatment with triphenylphosphine and treating the resultant phosphonium halide with butyl or phenyl lithium.

The 4-ethylene ketal is prepared from the corresponding 1-halo-4-alkanone obtained by treating the latter with ethylene glycol in the presence of an acid catalyst. The 1-halo-4-alkanone can be prepared by conventional processes, such as described in German Patent No. 801,276 Dec. 28, 1950). Briefly, these procedures involve treating butyrolactone with the desired alkyl alkanoate to provide the corresponding $\alpha$-acylbutyrolactone. Treatment of the latter with alkali metal halide in aqueous sulfuric acid affords the corresponding 1-bromo-4-alkanone.

When the dienes of formula (XVII) are treated with a carbalkoxymethyl phosphonate in the presence of an alkali metal hydride, the corresponding esters of formula (XVIII) where $R^{10}$ is $COOR^{11}$, are obtained. The corresponding free acids are obtained by conventional hydrolysis.

By reduction of the free acids, such as with lithium aluminum hydride, the corresponding alcohols of formula (XI), where $R^{10}$ is $CH_2R^{12}$, are obtained. The hydroxy group is esterified or etherified by conventional techniques.

By treating the above esters with unsubstituted, mono-substituted or disubstituted amines in the presence of an alkali metal alkyl, such as butyl lithium, the corresponding amides of formula (XVIII), where $R^{10}$ is $CONR^{13}R^{14}$, are obtained. The corresponding amine may be obtained by reducing the amide.

By treating the dienes of formula (XVII) with vinyl magnesium bromide, the corresponding 1,6,10-trien-3-ols are obtained. The latter, on treatment with a phosphorus trihalide, furnishes the corresponding 2,6,10-triene-1-halides. The corresponding disubstituted phosphonates of formula (XVIII), where $R^{10}$ is $CH_2PO(OR^{15})_2$, are obtained by treating the above halides with trisubstituted phosphites, such as triethyl phosphite. The corresponding amines of formula (XI), where $R^{10}$ is $CH_2NR^{13}R^{14}$, are obtained by treating the above halide with the appropriate amines.

Oxido groups are introduced by treating the trienes of formula (XVIII) with m-chloroperbenzoic acid in $CH_2Cl_2$ or $CHCl_3$. Methylene groups are introduced by treating the trienes with methylene iodide and a zinc copper couple. Difluoromethylene groups are introduced by treating the trienes with trimethyltrifluoromethyl tin in the presence of sodium iodide. The corresponding dichloromethylene groups are introduced by treating the triene with phenyldichlorobromomethyl mercury.

By treating the oxido derivatives with aqueous perchloric acid, the corresponding dihydroxy compounds are obtained, that is, a 10,11-oxido compound will furnish the corresponding 10,11-dihydroxy derivative; in the presence of an alkanol, the corresponding 10-hydroxy-11-alkoxy derivative is obtained. Treatment of an oxido derivative with a hydrogen halide furnishes the corresponding halo hydroxy group, that is, a 6,7-oxido compound will furnish a 6-hydroxy-7-halo compound; in the presence of an alkanol, the corresponding 6-alkoxy-7-halo derivative is obtained.

By treating the derivatives of formula (XVIII) with an aqueous mineral acid, the corresponding C-7 and/or C-11 mono- and dihydroxy derivatives are obtained. Treating the derivatives of formula (XVIII) with a hydrogen halide affords the corresponding C-7 and/or C-11 mono- or dihalo derivatives.

Treatment of the derivatives of formula (XVIII) with n-halo succinimide affords a corresponding C-6(10)-halo-C-7(11)-hydroxy derivative. When the reaction is performed in the presence of an alkanol under anhydrous conditions, the corresponding C-6(10)-halo-C-7(11)-alkoxy derivatives are obtained. Alternatively, the hydroxy groups may be esterified with treatment of a diazoalkane and borontrifluoride.

Hydroxy groups are esterified and etherified by conventional techniques.

By treatment of the derivatives of formula (XVIII) with a halide, the double bonds are halogenated yielding the corresponding mono-, bis- or tris-dihalo derivatives.

The double bonds of the derivatives of formula (XVIII) are hydrogenated with hydrogen in the presence of a palladium catalyst.

The acid addition salts of the amines are prepared from the amines and the appropriate organic or inorganic acids.

Typical halo starting compounds employed in the dehydrohalogenation process and which can be prepared according to the methods described above include the following:

3,7,11-trimethyl-7-bromododeca-2,10-dienoic acid, ethyl 3,7,11-trimethyl-7-bromododeca-2,10-dienoate,
methyl 3,7,11-trimethyl-7-chlorododeca-2,10-dienoate,
ethyl 3,7,11-trimethyl-7-chlorododec-2-enoate,
propyl 3,7,11-trimethyl-7-bromododec-2-enoate,
3,7,11-trimethyl-7-chlorododec-2-enoic acid,
3,7,11-trimethyl-7-chlorododeca-2,10-dien-1-ol,
3,7,11-trimethyl-7-chlorododec-2-en-1-ol,
N,N,-diethyl 3,7,11-trimethyl-7-bromododeca-2,10-dienamide,
N,N-diethyl 3,7,11-trimethyl-7-bromododec-2-enamide,
3,7,11-trimethyl-7-chlorododeca-2,10-dienamide,
1-pyrrolidino 3,7,11-trimethyl-7-bromododec-2-ene,
1-piperidino 3,7,11-trimethyl-7-chlorododeca-2,10-diene,
methyl 7-chloro-3,7,11-trimethyltrideca-2,10-dienoate,
methyl 7-chloro-3,7-diethyl-11-methyltrideca-2,10-dienoate,
ethyl 7-chloro-3,7,11-trimethyldodeca-2,10-dienoate,
7-chloro-3,7,11-trimethyldodeca-2,10-dienoic acid,
7-chloro-3,7-diethyl-11-methyltrideca-2,10-dienoic acid,
7-chloro-7,11-dimethyl-3-ethyltrideca-2,10-dienoic acid,
methyl 7-chloro-6-hydroxy-3,7,11-trimethyltrideca-2,10-dienoate,
methyl 7-chloro-6-acetoxy-3,7,11-trimethyltrideca-2,10-dienoate,
methyl 7-chloro-6-hydroxy-3,7,11-trimethyldodeca-2,10-dienoate,
7-chloro-6-hydroxy-3,7,11-trimethyltrideca-2,10-dienoic acid,
7-chloro-3,7,11-trimethyltrideca-2,10-dien-1-ol, 1,
1-acetoxy-7-chloro-3,7,11-trimethyltrideca-2,10-dien-6-ol,
7-chloro-1-methoxy-3,7,11-trimethyltrideca-2,10-dien-6-ol,
methyl 3,7,11-trimethyl-6-bromo-7-hydroxytrideca-2,10-dienoate,
3,7,11-trimethyl-11-bromododeca-2,6-dienoic acid,
3,7,11-trimethyl-11-chlorododeca-2,6-dienoic acid,
ethyl 3,7,11-trimethyl-11-bromododeca-2,6-dienoate,
ethyl 3,7,11-trimethyl-11-chlorododeca-2,6-dienoate,
methyl 3,7,11-trimethyl-11-chlorododeca-2,6-dienoate,
propyl 3,7,11-trimethyl-11-chlorododeca-2,6-dienoate,
ethyl 3,7,11-trimethyl-11-chlorododec-2-enoate,
ethyl 3,7,11-trimethyl-11-bromododec-2-enoate,
propyl 3,7,11-trimethyl-11-bromododec-2-enoate,
3,7,11-trimethyl-11-bromododec-2-enoic acid,
3,7,11-trimethyl-11-chlorododec-2-enoic acid,
isopropyl 3,7,11-trimethyl-11-chlorododeca-2,6-dienate,
3,7,11-trimethyl-11-chlorododeca-2,6-dien-1-ol,
3,7,11-trimethyl-11-bromododeca-2,6-dien-1-ol,
3,7,11-trimethyl-11-chlorododec-2-en-1-ol,
N,N-diethyl 3,7,11-trimethyl-11-chlorododeca-2,6-dienamide,
N,N-diethyl 3,7,11-trimethyl-11-bromododeca-2,6-dienamide,
N,N-diethyl 3,7,11-trimethyl-11-chlorododec-2-enamide,
N,N-diethyl 3,7,11-trimethyl-11-bromododec-2-enamide, N,N-dimethyl 3,7,11-trimethyl-11-bromododeca-2,6-dienamide,
3,7,11-trimethyl-11-chlorododeca-2,6-dienamide,
N-(4'-ethylpiperazino) 3,7,11-trimethyl-11-bromododeca-2,6-dienamide,
1-pyrrolidino 3,7,11-trimethyl-11-bromododec-2-ene,
1-morpholino 3,7,11-trimethyl-11-chlorododeca-2,6-diene,
1-piperidino 3,7,11-trimethyl-11-chlorododeca-2,6-diene,
methyl 3,7,11-trimethyl-11-chlorotrideca-2,6-dienoate,
methyl 11-chloro-3,7,11-trimethyltrideca-2,6-dienoate,
methyl 11-chloro-3,11-dimethyl-7-ethyltrideca-2,6-dienoate,
methyl 11-chloro-3,7-diethyl-11-methyltrideca-2,6-dienoate,
ethyl 11-chloro-3,7,11-trimethyltrideca-2,6-dienoate,
ethyl 11-chloro-3,7,11-trimethyldodeca-2,6-dienoate,
11-chloro-3,7,11-trimethyltrideca-2,6-dienoic acid,
11-chloro-3,7,11-trimethyldodeca-2,6-dienoic acid,
11-chloro-3,11-dimethyl-7-ethyltrideca-2,6-dienoic acid,
11-chloro-3,7-diethyl-11-methyltrideca-2,6-dienoic acid,
11-chloro-3,11-dimethyl-7-ethyldodeca-2,6-dienoic acid,
11-chloro-7,11-dimethyl-3-ethyltrideca-2,6-dienoic acid,
11-chloro-7,11-dimethyl-3-ethyldodeca-2,6-dienoic acid,
methyl 7,11-dichloro-3,7,11-trimethyltridec-2-enoate,
7,11-dichlor-3,7,11-trimethyltridec-2-en-1-ol,
methyl 11-chloro-10-hydroxy-3,7,11-trimethyltrideca-2,6-dienoate,
methyl 7,11-dichloro-10-hydroxy-3,7,11-trimethyltridec-2-enoate,
methyl 7-chloro-6-hydroxy-3,7,11-trimethyltrideca-2,10-dienoate
trimethyl 7,11-dichloro-6-hydroxy-3,7,11-trimethyltridec-2-enoate,
methyl 11-chloro-10-acetoxy-3,7,11-trimethyltrideca-2,6-dienoate,
methyl 7,11-dichloro-10-acetoxy-3,7,11-trimethyltridec-2-enoate,
methyl 11-chloro-10-hydroxy-3,7,11-trimethyldodeca-2,6-dienoate,
methyl 7,11-dichloro-10-hydroxy-3,7,11-trimethyldodec-2-enoate,
11-chloro-10-hydroxy-3,7,11-trimethyltrideca-2,6-dienoic acid,
7,11-dichloro-10-hydroxy-3,7,11-trimethyltridec-2-enoic acid,
11-chloro-3,7,11-trimethyltrideca-2,6-diene-1,10-diol,
7,11-dichloro-3,7,11-trimethyltridec-2-ene-1,10-diol,
1-acetoxy-11-chloro-3,7,11-trimethyltrideca-2,6-dien-10-ol,
1-acetoxy-7,11-dichloro-3,7,11-trimethyltridec-2-en-10-ol,
11-chloro-1-methoxy-3,7,11-trimethyltrideca-2,6-dien-10-ol,
7,11-dichloro-1-methoxy-3,7,11-trimethyltridec-2-en-10-ol,
methyl 3,7,11-trimethyl-10-bromo-11-hydroxytrideca-2,6-dienoate,
3,7,11-trimethyl-6-bromo-7-hydroxytrideca-2,10-dienoate,
methyl 3,7,11-trimethyl-6,10-dibromo-7,11-dihydroxytridec-2-enoate,
methyl 3,7,11-trimethyl-10-chloro-11-hydroxytrideca-2,6-dienoate,
methyl 7,11-dichloro-3-7,11-trimethyltridec-2-enoate,
methyl 7,11-dichloro-3,7,11-trimethyldodec-2-enoate,
methyl 7,11-dichloro-3,11-dimethyl-7-ethyltridec-2-enoate,
7,11-dichloro-3,7,11-trimethyltridec-2-enoic acid,
7,11-dichloro-3,7,11-trimethyldodec-2-enoic acid,
7,11-dichloro-3,11-dimethyl-7-ethyltridec-2-enoic acid,
methyl 11-bromo-3,7,11-trimethyltrideca-2,6-dienoate,
11-bromo-3,7,11-trimethyltrideca-2,6-dienoic acid,
11-bromo-3,7,11-trimethyltrideca-2,6,-dien-1-ol,
methyl 11-bromo-10-hydroxy-3,7,11-trimethyltrideca-2,6-dienoate,
methyl 7,11-dibromo-10-hydroxy-3,7,11-trimethyltridec-2-enoate,
methyl 7,11-dibromo-3,7,11-trimethyltridec-2-enoate,
methyl 7,11-dibromo-3,7,11-trimethyldec-2-enoate,
methyl 7,11-dibromo-3,11-dimethyl-7-ethyltridec-2-enoate,
methyl 11-chloro-10-methoxy-3,7,11-trimethyltrideca-2,6-dienoate,
methyl-7,11-dichloro-10-methoxy-3,7,11-trimethyltridec-2-enoate,
methyl-11-bromo-10-methoxy-3,7,11-trimethyltrideca-2,6-dienoate,
methyl 7,11-dibromo-10-methoxy-3,7,11-trimethyltridec-2-enoate,
methyl 3,7,11-trimethyl-10-bromo-11-methoxytrideca-2,6-dienoate,
methyl 3,7,11-trimethyl-6-bromo-7-methoxytrideca-2,10-dienoate,
methyl 3,7,11-trimethyl-6,10-dibromo-7,11-dimethoxytridec-2-enoate,
methyl 3,7,11-trimethyl-11-methoxytrideca-2,6-dienoate,
methyl 3,11-dimethyl-7-ethyl-11-methoxytrideca-2,6-dienoate,
potassium 11-chloro-3,7,11-trimethyltrideca-2,6-dienoate,
N,N-dimethyl-10-hydroxy-11-chloro-3,7,11-trimethyltrideca-2,6-dienamide,
N,N-diethyl-7,11-dichloro-10-hydroxy-3,7,11-trimethyltridec-2-enamide,
N,N-diethyl-10-hydroxy-11-chloro-3,7,11-trimethyldodeca-2,6-dienamide,
N,N-diethyl-10-hydroxy-11-chloro-3,11-dimethyl-7-ethyltrideca-2,6-dienamide,
N,N-diethyl-7,11-dichloro-10-hydroxy-3,7,11-trimethyldodec-2-enamide,
N,N-diethyl-7,11-dichloro-10-hydroxy-3,11-dimethyl-7-ethyltridec-2-enamide,
N,N-diethyl-7,11-dichloro-3,7,11-trimethyltridec-2-enamide,
N,N-diethyl-7,11-dichloro-3,7,11-trimethyldodec-2-enamide, N,N-diethyl-7,11-dichloro-3,11-dimethyl-7-ethyltridec-2-enamide,
N,N-diethyl-2-hydroxy-3-bromo-3,7,11-trimethyltrideca-6,10-dienamide,
N,N-diethyl-2-hydroxy-3,7-dibromo-3,7,11-trimethyltridec-10-enamide,
N,N-diethyl-2-hydroxy-3,7-difluoro-3,7,11-trimethyltridec-10-enamide,
N,N-diethyl-2-hydroxy-3,7,11-tribromo-3,7,11-trimethyltridecanamide,
N,N-diethyl-2-hydroxy-3,7,11-trifluoro-3,7,11-trimethyltridecanamide,
N,N-diethyl-10-hydroxy-11-bromo-3,7,11-trimethyltrideca-2,6-dienamide,
N,N-diethyl-10-hydroxy-7,11-dibromo-3,7,11-trimethyltridec-2-enamide,
N,N-diethyl-10-bromo-11-hydroxy-3,7,11-trimethyltrideca-2,6-dienamide,
N,N-diethyl-6-bromo-7-hydroxy-3,7,11-trimethyltrideca-2,10-dienamide,
N,N-diethyl-6,10-dibromo-7,11-dihydroxy-3,7,11-trimethyl-tridec-2-enamide,
N,N-diethyl-3,7,11-trimethyl-3-chlorotrideca-6,10-dienylamine,
N,N-diethyl-3,7,11-trimethyl-7-chlorotrideca-2,10-dienylamine,
N,N-diethyl-3,7,11-trimethyl-11-chlorotrideca-2,6-dienylamine,
N,N-diethyl-3,7,11-trimethyl-3,7-dichlorotridec-10-enylamine,
N,N-diethyl-3,7,11-trimethyl-3,11-dichlorotridec-7-enylamine,
N,N-diethyl-3,7,11-trimethyl-7,11-dichlorotridec-2-enylamine,
N,N-diethyl 3,7,11-trimethyl-3,7,11-trichlorotridecylamine,
N,N-diethyl-3,7,11-trimethyl-11-chlorododeca-2,6-dienylamine, N,N-diethyl-3,11-dimethyl-7-ethyl-11-chlorotrideca-2,6-dienyl amine, N,N-diethyl-3,7,11-trimethyl-6,7,11-trichloropentadec-2-enylamine, diethyl 3,11-dimethyl-7-ethyl-11-chlorotrideca-2,6-diene phosphonate, diethyl-3,7,11-trimethyl-11-chlorotrideca-2,6-dienyl phosphonate, diethyl-3,7,11-trimethyl-11-chlorododeca-2,6-dienyl phosphonate, dimethyl-3,7,11-tripropyl-11-chlorotetradeca-2,6-dienyl phosphonate, N,N-diethyl-3,7,11-trimethyl-6-hydroxy-7-chlorotrideca-2,10-dienyl amine, N,N-diethyl 3,7,11-trimethyl-6-hydroxy-7,11-dichlorotridec-2-enyl amine, N,N-diethyl 3,7,11-trimethyl-6-hydroxy-3,7-dichlorotridec-10-enyl amine, N,N-diethyl 3,7,11-trimethyl-6-hydroxy-3,7,11-trichlorotridecyl amine, N,N-diethyl 3,7,11-trimethyl-6-hydroxy-7-bromo trideca-2,10-dienyl amine, N,N-diethyl-2-hydroxy-3-chloro-3,7,11-trimethyltrideca-6,10-dienyl amine, 2-hydroxy-3,7-dichloro-3,7,11-trimethyltrideca-10-enyl amine, 2-hydroxy-3,7,11-trichloro-3,7,11-trimethyltridecanyl amine, N,N-diethyl-2-hydroxy-3-bromo-3,7,11-trimethyltrideca-6,10-dienyl amine, N,N-diethyl-2-hydroxy-3,7-dibromo-3,7,11-trimethyl-trideca-10-enyl amine, N,N-diethyl-2-hydroxy-3,7,11-tribromo-3,7,11-trimethyl-tridecanyl amine, N,N-diethyl 3,7,11-trimethyl-2-bromo-3-hydroxytrideca-6,10-dienyl amine, N,N-diethyl 3,7,11-trimethyl-6-bromo-7-hydroxytrideca-2,10-dienyl amine, N,N-diethyl 3,7,11-trimethyl-10-bromo-11-hydroxytrideca-2,6-dienyl amine, N,N-diethyl 3,7,11-trimethyl-2,6-dibromo-3,7-dihydroxytridec-10-enyl amine, N,N-diethyl 3,7,11-trimethyl-2,10-dibromo-3,11-dihydroxytridec-6-enyl amine, N,N-diethyl 3,7,11-trimethyl-6,10-dibromo-7,11-dihydroxytrideca-2-enyl amine, N,N-diethyl 3,7,11-trimethyl-2,6,10-tribromo-3,7,11-trihydroxytridecyl amine, N,N-diethyl 3,7,11-trimethyl-2-bromo-3-ethoxytrideca-6,10-dienyl amine, N,N-diethyl 3,7,11-trimethyl-6-bromo-7-ethoxytrideca-2,10-dienyl amine, N,N-diethyl 3,7,11-trimethyl-10-bromo-11-ethoxytrideca-2,6-dienyl amine, N,N-diethyl 3,7,11-trimethyl-2,6-dibromo-3,7-diethoxytridec-10-enyl amine, N,N-diethyl 3,7,11-trimethyl-2,10-dibromo-3,11-diethoxytridec-6-enyl amine, N,N-diethyl 3,7,11-trimethyl-6,10-dibromo-7,11-diethoxytridec-2-enyl amine, N,N-diethyl 3,7,11-trimethyl-2,6,10-tribromo-3,7,11-triethoxytridecylamine, N,N-diethyl 3,7,11-trimethyl-3,11-dichloro-10-hydroxytridec-6-enylamine, N,N-diethyl 3,7,11-trimethyl-7,11-dichloro-10-hydroxytridec-2-enylamine, and N,N-diethyl 3,7,11-trimethyl-3,7,11-trichloro-10-hydroxytridecyl amine.

The following examples will serve to further typify the nature of this invention. As these are presented solely for the purpose of illustration, they should not be construed as a limitation on the scope of this invention.

In some instances, for convenience, the various isomeric forms are specified; however, the carbon-carbon double bonds, epoxide, methylene, difluoromethylene, or dichloromethylene groupings can be cis or trans geometric isomers independent of each other and in fact isomeric mixtures are frequently employed in the described reactions.

EXAMPLE 1

Twenty-five grams of 1,5diazabicyclo[4,3,0]non-5-ene is added to a mixture of 30 g. of ethyl-3,7,11-trimethyl-7,11-dichlorotridec-2-enoate and 500 ml. of anhydrous benzene. The addition is performed at 30° C. The reaction mixture is heated to 100° C, for 4 hours and then allowed to stand at room temperature for an additional 60 minutes. Five hundred milliliters of diethylether is then added; the mixture is washed with three 200 ml. portions of 2N sulfuric acid and then with water to neutrality. The mixture is dried over sodium sulfate and evaporated under reduced pressure to yield a mixture of ethyl-3,7,11-trimethyltrideca-2,6,10-trienoate, ethyl-3,7,11-trimethyltrideca-2,6,11-trienoate, ethyl-3,7,11-trimethyl-trideca-2,7,10-trienoate, ethyl-3,7,11-trimethyltri-deca-2,7,11-trienoate, ethyl-3,11-dimethyl-7,7-methylenetri-deca-2,10-dienoate, ethyl-3,11-dimethyl-7,7-methylenetrideca-2,11-dienoate, ethyl-3,7-dimethyl-11,11-methylenetrideca-2,6-dienoate, ethyl-3,7-dimethyl-11,11-methylenetrideca-2,7-dienoate, and ethyl-3-methyl-7,7;11,11-bismethylenetridec-2-enoate. The compounds are separated by gas-liquid chromatography.

Similarly, other monochloro, dichloro, trichloro, monobromo, dibromo, tribromo starting compounds can be used in the above process to obtain the corresponding unsaturated compounds. For example, N,N-diethyl-3,11-dimethyl-7-ethyl-11-bromotrideca-2,6-dienamide when utilized as a starting compound in the present process will yield N,N-diethyl-3,11-dimethyl-7-ethyltrideca-2,6,10-trienamide, N,N-diethyl-3,11-dimethyl-7-ethyltrideca-2,6,11-trienamide, and N,N-diethyl-3-methyl-7-ethyl-11,11-methylenetrideca-2,6-dienamide.

EXAMPLE 2

To a mixture of N,N-diethyl-3,11-methyl-7-ethyl-7-chlorotrideca-2,10-dienamine and 500 ml. of dimethylacetamide is added 110 g. of sodium carbonate. The mixture is refluxed for 3 hours. The mixture is then cooled. Five hundred ml. of diethylether are added and the mixture is washed with water to neutrality, dried over sodium sulfate and evaporated under vacuum to yield a mixture of N,N-diethyl-3,11-dimethyl-7-ethyltrideca-2,6,10-trienamine, N,N-diethyl-3,11-dimethyl-7-ethyltrideca-2,7,10-trienamine, and N,N-diethyl-3,11-dimethyl-7,7-ethylidenetrideca-2,10-dienamine. The three compounds are separated by gas-liquid chromatography.

Similarly, other chloro or bromo starting materials are used in the above process as starting halo compounds. For example, 3,11-dimethyl-7-ethyl-7,11-dichlorotrideca-2-enol, 3,11-dimethyl-7-ethyl-7-chlorotrideca-2,10-dienol, ethyl-3,7,11-trimethyl-7-bromododeca-2,11-dienoate, 3,7,11-trimethyl-7,11-dichlorododec-2-enoate, and the like, are employed in the above process as starting halo compounds.

EXAMPLE 3

To a mixture of 60 g. of lithium carbonate and 250 ml. of dimethylformamide is added 10 g. of ethyl-3,7,11-trimethyl-10-chloro-11-ethoxydodeca-2,6-dienoate. The mixture is refluxed for 6 hours; then it is cooled. Two hundred and 50 ml. of diethylether is added, the mixture is washed with 3–1000 ml. portions of water, dried over sodium sulfate and evaporated under vacuum to yield ethyl-3,7,11-dimethyl-11-ethoxydodeca-2,6,9-trienoate. The residue is taken up in 500 ml. of aqueous 10percent acetic acid and refluxed for 5 minutes. After the reaction mixture has cooled, 100 ml. of methylene chloride is added; the mixture is washed to neutrality with water, dried over sodium sulfate and evaporated under vacuum to yield ethyl-3,7,11-trimethyl-11-hydroxydodeca-2,6,9-trienoate.

Similarly, methyl-3,7,11-trimethyl-7-hydroxydodeca-2,5,10-trienoate is prepared from methyl-3,7,11-trimethyl-6-chloro-7-ethoxydodeca-2,10-dienoate; and diethyl-3,11-dimethyl-7-ethyl-7,11-dihydroxydodeca-2,5-dienylphosphonate is prepared from diethyl-3,11-dimethyl-7-ethyl-6-chloro-7,11-dimethoxydodec-2-enylphosphonate; and N,N-diethyl-3,11-dimethyl-7,7-methylene-10,11-oxidotridec-2-enylamine is prepared from N,N-diethyl-3,7,11-trimethyl-7-chloro-10,11-oxidotridec-2-enylamine; and 1-ethoxy-3,11-methyl-7-ethyl-10,11-dichloromethylenetrideca-2,7-diene and 1-ethoxy-3,11-dimethyl-7,7-ethylidene-10,11-dichloromethylenetridec-2-ene are prepared from 1-ethoxy-3,11-dimethyl-7-ethyl-7-chloro-10,11-dichloromethylenetridec-2-ene.

Similarly, other 6-chloro or 6-bromo, or 7-chloro or 7-bromo, and/or 10-chloro or 10-bromo, or 11-chloro or 11-bromo starting compounds may be utilized in the above process to give the corresponding unsaturated compounds.

EXAMPLE 4

To a mixture of 100 g. of lithium bromide, 10 g. of lithium carbonate and 500 ml. of dimethyl acetamide is added 25 g. of 3-methyl-7,11-diethyl-7,11-dichloro-10-ethoxytridec-2-enoyl-morpholine; the mixture is refluxed for 2 hours. The mixture is cooled and 500 ml. of methylchloride is added; the mixture is washed with water to neutrality, dried over sodium sulfate and evaporated under reduced pressure to yield 3-methyl-7,11-diethyl-10-ethoxytrideca-2,6,11-trienoylmorpholine, 3-methyl-7,11-diethyl-10-ethoxytrideca-2,7,11-trienoylmorpholine and 3-methyl-7-ethylidene-11-ethyl-10-ethoxytridec-2,11-dienoylmorpholine. The three compounds are separated by gas-liquid chromatography.

Similarly, 3,7,11-trimethyl-10-ethoxydodeca-2,6,11-trienoic acid, 3,7,11-trimethyl-10-ethoxydodeca-2,7,11-trien-oic acid, and 3,11-dimethyl-7,7-methylene-10-ethoxydodeca-2,11-dienoic acid are prepared from 3,7,11-trimethyl-7,11-dichloro-10-ethoxydodec-2-enoic acid.

EXAMPLE 5

To a mixture of 90 g. of 1,5-diazabicyclo [4,3,0] non-5-ene and 500 ml. of anhydrous toluene heated to 100° C. is slowly added a mixture of 100 g. of 3,11-dimethyl-7-ethyl-7,11-dibromotridec-2-enoyl pyrrolidine and 500 ml. of anhydrous toluene. After the addition is complete, the reaction mixture is allowed to stand at 100° C. for 8 hours, then it is cooled to room temperature and allowed to stand for 3 hours. A liter of diethylether is added and the mixture is washed with three 250 ml. portions of 2N sulfuric acid, then with water to neutrality, dried over sodium sulfate and evaporated under vacuum to yield a mixture containing 3,11-dimethyl-7-ethyltrideca-2,6,10-trienoyl pyrrolidine, 3,11-dimethyl-7-ethyltrideca-2,6,11-trienoyl pyrrolidine, 3,11-dimethyl-7-ethyltrideca-2,7,10-trienoyl pyrrolidine, 3,11-dimethyl-7-ethyltrideca-2,7,11-trienoyl pyrrolidine, 3,11-dimethyl-7-ethylidenetrideca-2,10-dienoyl pyrrolidine, 3,11-dimethyl-7-ethylidenetrideca-2,11-dienoyl pyrrolidine, 3-methyl-7-ethyl-11,11-methylenetrideca-2,6-dienoyl pyrrolidine, 3-methyl-7-ethyl-11,11-methylenetrideca-2,7-dienoyl pyrrolidine, and 3-methyl - 7 - ethylidene-11,11-methylenetridec-2-enoyl pyrrolidine.

Other 7,11-dichloro or -dibromo starting materials are utilized in the above process to yield the corresponding unsaturated compounds. For example, methyl-3,7,11-trimethyl-2,3-methylenetrideca-6,10-dienoate, methyl-3,7,11-trimethyl-2,3-methylenetrideca-6,11-dienoate, methyl-3,7,11-trimethyl-2,3-methylenetrideca-7,10-dienoate, methyl-3,7,11-trimethyl-2,3-methylenetrideca-7,11-dienoate, methyl-3,11-dimethyl-7,7-methylene-2,3-methylenetridec-10-enoate, methyl-3,11-dimethyl-7,7-methylene-2,3-methylenetridec-11-enoate, methyl-3,7-dimethyl-11,11-methylene-2,3-methylenetridec-7-enoate, and methyl-3-methyl-7,7;11,11-bismethylene-2,3-methylenetridecenoate are prepared from methyl-3,7,11-trimethyl-7,11-dichloro-2,3-methylenetridecenoate; and 1-piperidino-3,7,11-trimethyldodeca-2,6,10-triene, 1-piperidino-3,7,11-trimethyldodeca-2,6,11-triene, 1-piperidino-2,7,11-trimethyldodeca-2,7,10-triene, 1-piperidino-3,7-dimethyl-11,11-methylenedodeca-2,6-diene, 1-piperidino-3,7-dimethyl-11,11-methylenedodeca-2,7-diene, 1-piperidino-3methyl-7,7;11,11-bis-methylenedodec-2-ene, 1-piperidino-3,11-dimethyl-7,7-methylenedodeca-2,10-diene, and 1-piperidino-3,11-dimethyl-7,7methylenedodeca 2,11-diene are prepared from 1-piperidino-3,7,11-trimethyl-7,11-dibromododec-2-ene.

EXAMPLE 6

A mixture of 50 g. of N,N-dimethyl-3-methyl-7,11-diethyl-7-ethoxy-11-chlorohexadec-2-enylamine and 500 ml. of triethylamine are refluxed for 20 hours; the mixture is then cooled and 500 ml. of diethylether are added. The mixture is washed with water to neutrality, dried over sodium sulfate and evaporated under reduced pressure to yield a mixture of N,N-dimethyl-3-methyl-7,11-diethyl-7-ethoxyhexadeca-2,10-dienylamine, N,N-dimethyl-3-methyl-7,11-diethyl-7-ethoxyhexadeca-2,11-dienylamine, and N,N-dimethyl-3-methyl-7-ethyl-11,11-ethylidenehexadec-2-enyl-amine. The compounds are separated by distillation and gas-liquid chromatography.

EXAMPLE 7

A mixture of 1 g. of ethyl-3,7,11-trimethyl-11-chlorododeca-2,6-dienoate and 15 ml. of triethylamine are refluxed for 25 hours. The mixture is cooled and 100 ml. of benzene are added. The resulting mixture is washed with water to neutrality, dried over sodium sulfate and evaporated under vacuum. One milligram of the residue is chromatographed on a 12 foot by 3 mm. I.D. glass column packed with 100/120 mesh acid washed firebrick coated with 5 percent DEGS (diethyleneglycol succinate). The carrier gas, nitrogen, flow rate is 40 ml. per minute, and the separation is performed at 150° C. Two fractions, one containing ethyl-3,7,11-trimethyldodeca-2,6,11-trienoate and the other containing ethyl-3,7,11-trimethyldodeca-2,6,10-trienoate, are collected. The fractions are identified by a combination of infrared spectral, mass spectral and nuclear magnetic resonance spectral data, and conventional ozonolysis.

EXAMPLE 8

A mixture of 10 g. of 1-(tetrahydrofuran-2'-yloxy)3,7,11-trimethyl-11-chlorotridec-2,6-diene, 75 ml. of quinoline, 75 ml. of triethylamine, and 10 g. of sodium carbonate is refluxed for 3 hours under anhydrous conditions. Two hundred milliliters of benzene are added to the cooled mixture, and the resultant mixture is washed with five 150 ml. portions of methanol and with water to neutrality, dried over magnesium sulfate and evaporated under vacuum. The product mixture is chromatographed as described in the previous example. Three fractions are collected; one fraction contains 1-(tetrahydrofuran-2'-yloxy)-3,7,11-trimethyltrideca-2,6,10-triene, another fraction contains 1-(tetrahydrofuran-2'-yloxy)-3,7,11-trimethyl-trideca-2,6,11-triene, and the other fraction contains 1-(tetrahydrofuran-2'-yloxy)-3,7-dimethyl-11,11-methylenetrideca-2,6-diene. Each fraction is identified by a combination of infra-red spectral, mass spectral and nuclear magnetic resonance spectral data.

EXAMPLE 9

A mixture of ethyl-3,11-dimethyl-7-ethyl-10,11-oxidotridec-6-enoate, ethyl-3,11-dimethyl-7-ethyl-10,11-oxidotridec-7-enoate, and ethyl-3,11-dimethyl-7-ethylidene-10,11-oxidotridecenoate (prepared from ethyl-3,11-dimethyl-7-ethyl-7-chloro-10,11-oxidotridecenoate by the process of Example 9) are separated by a combination of fractional vacuum distillation and gas-liquid chromatography (as described in Example 7).

The fraction containing the compound substituted with the 7-ethylidene group is readily identified by its nuclear magnetic resonance spectrum due to the characteristic doublet of the 7-ethylidene group.

The fraction containing the 6-ene compound is ozonized with 1.1 molar equivalents of ozone in ethylacetate at −80° C. Three molar equivalents of glacial acetic acid are added, followed by the slow addition of 1.1 molar equivalents of zinc dust. The mixture is filtered and evaporated under reduced pressure. The residue is chromatographed by gas-liquid chromatography to yield one fraction containing (1) 6,7-oxido-7-methylnonan-3-one and another fraction containing (2) ethyl-3-methyl-5-formylpentanoate. The molecular weight (170) of fraction (1) and the molecular weight (172) of fraction (2) is determined by mass spectroscopy. The 3-keto group, the 6,7-oxido group and the 7-methyl group of the compound of fraction (1) are identified and their positions determined by nuclear magnetic resonance. The 3-methyl and the 5-formyl groups of the compound of fraction (2) are also identified and their positions determined by nuclear magnetic resonance.

The fraction containing the 7-ene compound is likewise ozonized and reduced and separated by gas-liquid chromatography to yield two fractions. One fraction contains 3,4-oxido-4-methylhexanal, and the other fraction contains ethyl-3-methyl-7-oxononanoate. The two fractions are also identified by the same techniques used immediately above.

EXAMPLE 10

A. 25 grams of 1,5-diazabicyclo[4,3,0]non-5-ene is added to 30 g. of methyl 11-chloro-10-acetoxy-3,7,11-trimethyl-dodeca-2,6-dienoate in 500 ml. of anhydrous benzene at 30° C. The reaction mixture is heated to 100° C. for 4 hours and then allowed to stand at room temperature for an additional 60 minutes. Ether (500 ml.) is added and the resulting mixture washed with three 200 ml. portions of 2 N sulfuric acid and then with water to neutrality, dried over sodium sulfate and evaporated under reduced pressure to yield methyl 3,7-dimethyl-11-methylene-10-acetoxydodeca-2,6-dienoate which is purified by chromatography.

B. The process of Part A is repeated using each of methyl 3,7,11-trimethyl-11-chloro-10-acetoxytrideca-2,6-dienoate, methyl 3,7,11-trimethyl-7,11-dichloro-6,10-diacetoxydodec-2-enoate, methyl 3,7,11-trimethyl-11-chloro-10-hydroxydodeca-2,6-dienoate, methyl 3,7,11-trimethyl-7,11-dichloro-6,10-dihydroxydodec-2-enoate, methyl 3,7,11-trimethyl-6,10-diacetoxy-7,11-dichlorotridec-2-enoate, methyl 3,7,11-trimethyl-11-chloro-10-hydroxytrideca-2,6-dienoate, methyl 3,11-dimethyl-7-ethyl-10-hydroxy-11-chlorododeca-2,6-ienoate, methyl 3,11-dimethyl-7-ethyl-11-chloro-10-acetoxytrideca-2,6-dienoate, methyl 3,11-dimethyl-7-ethyl-11-chloro-10-hydroxytrideca-2,6-dienoate, methyl 3,11-dimethyl-7-ethyl-7,11-dichloro-6,10-diacetoxytridec-2-enoate, methyl 3,11-dimethyl-7-ethyl-7,11-dichloro-6,10-dihydroxytridec-2-enoate, methyl 3,7,11-trimethyl-7,11-dichloro-6-hydroxy-10-acetoxydodec-2-enoate and methyl 3,7,11-trimethyl-7,11-dichloro-6-acetoxy-10-hydroxydodec-2-enoate in place of methyl 11-chloro-10-acetoxy-3,7,11-trimethyldodeca-2,6-dienoate as the starting material to yield methyl 3,7-dimethyl-11-methylene-10-acetoxytrideca-2,6-dienoate, methyl 3-methyl-7,11-bismethylene-6,10-diacetoxydodec-2-enoate, methyl 3,7-dimethyl-11-methylene-10-hydroxydodeca-2,6-dienoate, methyl 3-methyl-7,11-bismethylene-6,10-dihydroxydodec-2-enoate, methyl 3-methyl-7,11-bismethylene-6,10-diacetoxytridec-2-enoate, methyl 3,7-dimethyl-11-methylene-10-hydroxytrideca-2,6-dienoate, methyl 3-methyl-7-ethyl-11-methylene-10-hydroxydodeca-2,6-dienoate, methyl 3-methyl-7-ethyl-11-methylene-10-acetoxytrideca-2,6-dienoate, methyl 3-methyl-7-ethyl-11-methylene-10-hydroxytri-deca-2,6-dienoate, methyl 3-methyl-7-ethylidene-11-methylene-6,10-diacetoxytridec-2-enoate, methyl 3-methyl-7-ethylidene-11-methylene-6,10-dihydroxytridec-2-enoate, methyl 3-methyl-7,11-bis-methylene-6-hydroxy-10-acetoxydodec-2-enoate and methyl 3-methyl-7,11-bismethylene-6-acetoxy-10-hydroxydodec-2-enoate, respectively.

C. Similarly, other lower alkyl esters of the starting materials of Part A and B are employed to yield the corresponding allylic acetates and allylic alcohols, such as the ethyl esters, e.g. ethyl 11-chloro-10-acetoxy-3,7,11-trimethyl-dodeca-2,6-dienoate, ethyl 3,7,11-trimethyl-11-chloro-10-acetoxytrideca-2,6-dienoate, ethyl 3,7,11-trimethyl-7,11dichloro-6,10-acetoxydodec-2-enoate, ethyl 3,7,11-trimethyl-11-chloro-10-acetoxytrideca-2,6-dienoate, ethyl 3,7,11-trimethyl-7,11-dichloro-6,10-dihydroxydodec-2-enoate, ethyl 3,7,11-trimethyl-6,10-diacetoxy-7,11-dichlorotridec-2-enoate, ethyl 3,7,11-trimethyl-11-chloro-10-hydroxytrideca-2,6-dienoate, etc. are employed to yield ethyl 11-methylene-10-acetoxy-3,7-dimethyldodeca-2,6-dienoate, ethyl 3,7-dimethyl-11-methylene-10-acetoxytrideca-2,6-dienoate, ethyl 3-methyl-7,11-bis-methylene-6,10-diacetoxydodec-2-enoate, ethyl 3,7-dimethyl-11-methylene-10-hydroxydodeca-2,6-dienoate, ethyl 3-methyl-7,11-bismethylene-6,10-dihydroxydodec-2-enoate, ethyl 3-methyl-7,11-bismethylene-6,10-diacetoxytridec-2-enoate, ethyl 3,7-dimethylll-methylene-10-hydroxytrideca-2,6-dienoate, etc., respectively.

D. Into a mixture of 2 g. of methyl 10,11-oxido-3,7,11-trimethyltrideca-2,6-dienoate in 150 ml. of ether, there is introduced a slow stream of hydrogen chloride for 1 hour at 0° C. The mixture is then allowed to stand at 0° C. for 18 hours. Then the mixture is washed with 5 percent aqueous sodium bicarbonate solution, dried over sodium sulfate and evaporated to an oil containing methyl 11-chloro-10-hydroxy-3,7,11-trimethyltrideca--dienoate and methyl 7,11-dichloro-10-hydroxy-3,7,11-trimethyltridec-2-enoate which are purified and separated by preparative silica chromagraphy.

By repeating the foregoing process using as the starting material each of methyl 10,11-oxido-3,7,11-trimethyl-dodeca-2,6-dienoate, methyl 10,11-oxido-3,11-dimethyl-7-ethyltrideca-2,6-dienoate, 10,11-oxido-3,7,11-trimethyldodeca-2,6-dien-1-ol, ethyl 10,11-oxido-3,7,11-trimethyldodec-2,6-dienoate, ethyl 10,11-oxido-3,7,11-trimethyltrideca-2,6-dienoate and ethyl 10,11-oxido-3,11-dimethyl-7-ethyltrideca-2,6-dienoate, there is obtained methyl 11-chloro-10-hydroxy-3,7,11-trimethyldodeca-2,6-dienoate, methyl 11-chloro-10-hydroxy-3,11-dimethyl-7-ethyltrideca-2,6-dienoate, 11-chloro-10-hydroxy-3,7,11-trimethyldodeca-2,6-dien-1-ol, ethyl 11-chloro-10-hydroxy-3,7,11-trimethyltrideca-2,6-dienoate and ethyl 11-chloro-10-hydroxy-3,11-dimethyl-7-ethyltrideca-2,6-dienoate, respectively.

By repeating the above procedure using hydrogen bromide in place of hydrogen chloride, the corresponding 11-bromo-10-hydroxy and 7,11-dibromo-10-hydroxy derivatives are obtained.

E. A mixture of 1 g. of methyl 11-chloro-10-hydroxy-3,7,11-trimethyldodeca-2,6-dienoate, 8 ml. of pyridine and 2 ml. of acetic anhydride is allowed to stand at room temperature for 15 hours. The mixture is then poured into water and stirred and extracted with methylene chloride. The organic extracts are dried and evaporated to yield methyl 11-chloro-10-acetoxy-3,7,11-trimethyldodeca-2,6-dienoate.

Alternatively, the esters can be prepared in pyridine solution by treatment with triethylamine and acetyl chloride.

Using the foregoing procedure, the other 11-chloro-10-hydroxy and 11-bromo-10-hydroxy compounds are converted into the 11-halo-10-acetate derivative.

F. To a mixture of 2 g. of methyl 11-chloro-10-acetoxy-3,7,11-trimethyldodeca-2,6-dienoate in 100 ml. of methylene chloride at 0° C., there is slowly added one molar equivalent of m-chloroperbenzoic acid in 100 ml. of methylene chloride. The resulting mixture is then allowed to stand for 15 minutes at 0° C. and then is washed, dried over sodium sulfate and evaporated to yield methyl 11-chloro-10-acetoxy-6,7-oxido-3,7,11-trimethyldodec-2-enoate which treated with HCl using the procedure of Part D affords methyl 7,11-dichloro-10- acetoxy-6-hydroxy-3,7,11-trimethyldodec-2-enoate which is converted into methyl 7,11-dichloro-6,10-diacetoxy-3,7,11-trimethyldodec-2-enoate using the process of Part E.

Methyl 11-chloro-10-hydroxy-3,7,11-trimethyldodeca-2,6,-dienoate is converted into the 6,7-epoxide using the foregoing process. The 6,7-epoxide is treated with HCl to afford methyl 7,11-dichloro-6,10-dihydroxy-3,7,11-trimethyldodec-2-enoate which is acetylated using acetic anhydride in pyridine to yield the corresponding 6,10-diacetate.

Alternatively, the 10,11- or 6,7-epoxide can be opened to the 11-chloro-10-hydroxy or 7-chloro-6-hydroxy derivative using aqueous hydrochloric acid in tetrahydrofuran at about 0° C.

By treating the epoxide with HCl in acetic acid at room temperature or lower, e.g. 0° C., the epoxide, e.g. methyl 11-chloro-10-acetoxy-6,7-oxido-3,7,11-trimethyldodec-2-enoate yields the chloro-acetate, e.g. methyl 7,11-dichloro-6,10-diacetoxy-3,7,11-trimethyldodec-2-enoate.

G. Using the methods of Part F, each of ethyl 11-chloro-10-hydroxy-3,7,11-trimethyldodeca-2,6-dienoate, ethyl 11-chloro-10-acetoxy-3,7,11-trimethyldodeca-2,6-dienoate, methyl 11-chloro-10-hydroxy-3,7,11-trimethyltrideca-2,6-dienoate, methyl 11-chloro-10-acetoxy-3,7,11-trimethyltrideca-2,6-dienoate and methyl 11-chloro-10-hydroxy-3,11-dimethyl-7-ethyltrideca-2,6-dienoate is converted into ethyl 7,11-dichloro-6,10-dihydroxy-3,7,11-trimethyldodec-2-enoate and ethyl 7,11-dichloro-6,10-diacetoxy-3,7,11-trimethyldodec-2-enoate; ethyl 7,11-dichloro-10-acetoxy-6-hydroxy-3,7,11-trimethyldodec-2-enoate and ethyl 7,11-dichloro-6,10-diacetoxy-3,7,11-trimethyldodec-2-enoate; methyl 7,11-dichloro-6,10-dihydroxy-3,7,11-trimethyltridec-2-enoate and methyl 7,11-dichloro-6,10-diacetoxy-3,7,11-trimethyltridec-2-enoate; methyl 7,11-dichloro-10-acetoxy-6-hydroxy-3,7,11-trimethyltridec-2-enoate and methyl 7,11-dichloro-6,10-diacetoxy-3,7,11-trimethyltridec-2-enoate and methyl 7,11-dichloro-6,10-dihydroxy-3,11-dimethyl-7-ethyltridec-2-enoate and methyl 7,11-dichloro-6,10-diacetoxy-3,11-dimethyl-7-ethyltridec-2-enoate, respectively.

EXAMPLE 11

A. 25 grams of 1,5-diazabicyclo[4,3,0]non-5-ene is added to a mixture of 30 g. of N,N-diethyl 11-chloro-10-hydroxy-3,7,11-trimethyldodeca-2,6-dienamide and 500 ml. of anhydrous benzene. The addition is performed at 30° C. The reaction mixture is heated to 100° C. for 4 hours and then allowed to stand at room temperature for an additional 60 minutes. Five hundred ml. of ether is then added, the mixture is washed with three 200 ml. portions of 2 N sulfuric acid and then with water to neutrality. The mixture is dried over sodium sulfate and evaporated under reduced pressure to yield N,N-diethyl 11-methylene-10-hydroxy-3,7-dimethyldodeca-2,6-dienamide which is purified by chromatography.

B. The process of Part A is repeated with the exception of using each of N,N-dimethyl 11-chloro-10-hydroxy-3,7,11-trimethyldodeca-2,6-dienamide, N,N-diethyl 11-chloro-10-acetoxy-3,7,11-trimethyldodeca-2,6-dienamide, N,N-dimethyl 11-chloro-10-acetoxy-3,7,11-trimethyldodeca-2,6-dienamide, N,N-diethyl 7,11-dichloro-6,10-hydroxy-3,7,11-trimethyldodec-2-enamide, N,N-dimethyl 7,11-dichloro-6,10-hydroxy-3,7,11- trimethyldodec-2-enamide, N,N-diethyl 7,11-dichloro-6,10-diacetoxy-3,7,11-trimethyldodec-2-enamide, N,N-dimethyl 7,11-dichloro-6,10-diacetoxy-3,7,11-trimethyldodec-2-enamide, N,N-dimethyl 11-chloro-10-hydroxy-3,7,11-trimethyltrideca-2,6-dienamide, N,N-diethyl 11-chloro-10-acetoxy-3,7,11-trimethyltrideca-2,6-dienamide, N,N-diethyl 11-chloro-10-hydroxy-3,7,11-trimethyltrideca-2,6-dienamide, N,N-diethyl 11-chloro-10-acetoxy-3,7,11-trimethyltrideca-2,6-dienamide, N,N-dimethyl 7,11-dichloro-6,10-dihydroxy-3,7,11-trimethyltridec-2-enamide, N,N-dimethyl 7,11-dichloro-6,10-diacetoxy-3,7,11-trimethyltridec-2-enamide, N,N-diethyl 7,11-dichloro-6,10-diacetoxy-3,7,11-trimethyltridec-2-enamide, N,N-diethyl 7,11-dichloro-6,10-dihydroxy-3,7,11-trimethyltridec-2-enamide, N,N-dimethyl 11-chloro-10-hydroxy-3,11-dimethyl-7-ethyltrideca-2,6-dienamide, N,N-dimethyl 11-chloro-10-acetoxy-3,11-dimethyl-7-ethyltrideca-2,6-dienamide, N,N-diethyl 7,11-dichloro-6,10-diacetoxy-3,11-dimethyl-7-ethyltridec-2-enamide, N,N-diethyl 7,11-dichloro-6,10-dihydroxy-3,11-dimethyl-7-ethyltridec-2-enamide, N-methyl 11-chloro-10-acetoxy-3,7,11-trimethyldodeca-2,6-dienamide, 11-chloro-10-acetoxy-3,7,11-trimethyldodeca-2,6-dienamide and 11-chloro-10-hydroxy-3,7,11-trimethyldodeca-2,6-dienamide, as the starting material in place of N,N-diethyl 11-chloro-10-hydroxy-3,7,11-trimethyldodeca-2,6-dienamide to yield N,N-dimethyl 11-methylene-10-hydroxy-3,7-dimethyldodeca-2,6-dienamide, N,N-diethyl 11-methylene-10-acetoxy-3,7-dimethyldodeca-2,6-dienamide, N,N-dimethyl 11-methylene-10-acetoxy-3,7-dimethyldodeca-2,6-dienamide, N,N-diethyl 7,11-bismethylene-6,10-dihydroxy-3-methyldodec-2-enamide, N,N-dimethyl 7,11-bismethylene-6,10-dihydroxy-3-methyldodec-2-enamide, N,N-diethyl 7,11-bismethylene-6,10-diacetoxy-3-methyldodec-2-enamide, N,N-dimethyl 11-methylene-10-hydroxy-3,7-dimethyltrideca-2,6-dienamide, N,N-dimethyl 11-methylene-10-acetoxy-3,7-dimethyltrideca-2,6-dienamide, N,N-diethyl 11-methylene-10-hydroxy-3,7-dimethyl-trideca-2,6-dienamide, N,N-diethyl 11-methylene-10-acetoxy-3,7-dimethyltrideca-2,6-dienamide, N,N-dimethyl 7,11-bismethylene-6,10-dihydroxy-3-methyltridec-2-enamide, N,N-dimethyl 7,11-bismethylene-6,10-diacetoxy-3-methyltridec-2-enamide, N,N-diethyl 7,11-bismethylene-6,10-diacetoxy-3-methyltridec-2-enamide, N,N-diethyl 7,11-bismethylene-6,10-dihydroxy-3-methyltridec-2-enamide, N,N-dimethyl 11-methylene-10-hydroxy-3-methyl-7-ethyltrideca-2,6-dienamide, N,N-dimethyl 11-methylene-10-acetoxy-3-methyl-7-ethyltrideca-2,6-dienamide, N,N-diethyl 11-methylene-7-ethylidene-6,10-diacetoxy-3-methyltridec-2-enamide, N,N-diethyl 11-methylene-7-ethylidene-6,10-dihydroxy-3-methyltridec-2-enamide, N-methyl 11-methylene-10-acetoxy-3,7-dimethyldodeca-2,6-dienamide, 11-methylene-10-acetoxy-3,7-dimethyldodeca-2,6-dienamide and 11-methylene-10-hydroxy-3,7-dimethyldodeca-2,6-dienamide, respectively.

As described hereinabove, dehydrohalogenation of halohydrins affords a mixture of products and the novel derivatives are separated by chromatography. For example,

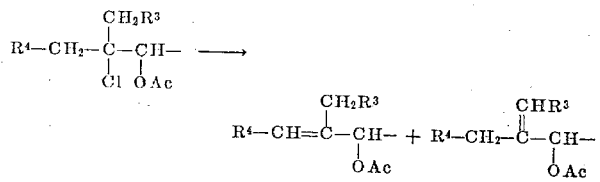

$R^3 \neq R^4$ and OAc is acetoxy or hydroxy.

C. Into a mixture of 2 g. of N,N-diethyl 10,11-oxido-3,7,11-trimethyltrideca-2,6-dienamide in 150 ml. of ether, there is introduced a slow stream of hydrogen chloride for 1 hour at 0° C. The mixture is then allowed to stand at 0° C. for 18 hours. Then the mixture is washed, dried over sodium sulfate and evaporated to an oil containing a mixture of N,N-diethyl 11-chloro-10-hydroxy-3,7,11-trimethyltrideca-2,6-dienoamide and N,N-diethyl 7,11-dichloro-10-hydroxy-3,7,11-trimethyltridec-2-enamide which are purified and separated by preparative silica chromatography.

In like manner, N,N-diethyl 11-chloro-10-hydroxy-3,7,11-trimethyldodeca-2,6-dienamide and N,N-diethyl 11-chloro-10-hydroxy-3,11-dimethyl-7-ethyltrideca-2,6-dienamide are prepared from N,N-diethyl 10,11-oxido-3,7,11-trimethyldodeca-2,6-dienamide and N,N-diethyl 10,11-oxido-3,11-dimethyl-7-ethyltrideca-2,6-dienamide.

Also thus analogously elaborated are the 6,7-oxido and 6,7;10,11-dioxido derivatives thereof to the 6-hydroxy-7-chloro, 6-hydroxy-7,11-dichloro and 6,10-dihydroxy-7,11-dichloro compounds.

The chlorohydrins are converted into the chloroacetate using acetic anhydride or acetyl chloride as described in Example 10. Thus, N,N-diethyl 11-chloro-10-acetoxy-3,7,11-trimethyltrideca-2,6-dienamide, N,N-diethyl 11-chloro-10-acetoxy-3,7,11-trimethyldodeca-2,6-dienamide and N,N-diethyl 11-chloro-10-acetoxy-3,11-dimethyl-7-ethyltrideca-2,6-dienamide are prepared from the corresponding 11-chloro-10-hydroxy compounds.

D. To a mixture of 2 g. of N,N-diethyl 11-chloro-10-hydroxy-3,7,11-trimethyldodeca-2,6-dienamide in 100 ml. of methylene chloride at 0° C., there is slowly added one molar equivalent of m-chloroperbenzoic acid in 100 ml. of methylene chloride. The resulting mixture is then allowed to stand for 15 minutes at 0° C. and then is washed, dried over sodium sulfate and evaporated to yield N,N-diethyl 11-chloro-10-hydroxy-6,7-oxido-3,7,11-trimethyldodec-2-enamide which is purified by chromatography. Treatment of the 6,7-epoxide with HCl as described above or in Example 10 affords N,N-diethyl 7,11-dichloro-6,10-dihydroxy-3,7,11-trimethyldodec-2-enamide which is acetylated using acetic anhydride in pyridine to yield the diacetate, i.e. N,N-diethyl 7,11-dichloro-6,10-diacetoxy-3,7,11-trimethyldodec-2-enamide.

By use of the above procedure, each of N,N-dimethyl 11-chloro-10-hydroxy-3,7,11-trimethyldodeca-2,6-dienamide, N,N-dimethyl 11-chloro-10-acetoxy-3,7,11-trimethyldodeca-2,6-dienamide and N,N-diethyl 11-chloro-10-acetoxy-3,7,11-trimethyldodeca-2,6-dienamide is converted into N,N-dimethyl 7,11-dichloro-6,10-dihydroxy-3,7,11-trimethyldodec-2-enamide and the 6,10-diacetate; N,N-dimethyl 7,11-dichloro-10-acetoxy-6-hydroxy-3,7,11-trimethyldodec-2-enamide and the 6-acetate; and N,N-diethyl 7,11-dichloro-10-acetoxy-6-hydroxy-3,7,11-trimethyldodec-2-enamide and the 6-acetate thereof.

EXAMPLE 12

By repeating the process of Part A, Example 10, using each of methyl 11-chloro-10-acetoxy-3,7,11-trimethyltrideca-2,6-diennoate, methyl 11-chloro-10-hydroxy-3,7,11-trimethyltrideca-2,6-dienoate and methyl 11-chloro-10-hydroxy-3,11-dimethyl-7-ethyltrideca-2,6-dienoate as the starting material, there is obtained a mixture containing methyl 11-methylene-10-acetoxy-3,7-dimethyltrideca-2,6-dienoate and methyl 10-acetoxy-3,7,11-trimethyltrideca-2,6,11-trienoate; a mixture containing methyl 11-methylene-10-hydroxy-3,7-dimethyltrideca-2,6-dienoate and methyl 10-hydroxy-3,7,11-trimethyltrideca-2,6,11-trienoate; and a mixture containing methyl 11-methylene-10-hydroxy-3-methyl-7-ethyltrideca-2,6-dienoate and methyl 10-hydroxy-3,11-dimethyl-7-ethyltrideca-2,6,11-trienoate, respectively, which are purified and separated by chromatography.

EXAMPLE 13

The process of Part A, Example 11 is repeated using N,N-dimethyl 11-chloro-10-hydroxy-3,7,11-trimethyltrideca-2,6-dienamide to yield a mixture containing N,N-dimethyl 11-methylene-10-hydroxy-3,7-dimethyltrideca-2,6-dienamide and N,N-dimethyl 10-hydroxy-3,7,11-trimethyltrideca-2,6,11-trienamide which is separated and purified by chromatography and distillation.

EXAMPLE 14

Each of 11-chloro-3,7,11-trimethyldodeca-2,6-diene-1,10-diol, 11-chloro-3,7,11-trimethyldodeca-2,6-diene-1,10-diol 1-acetate, 11-chloro-3,7,11-trimethyldodeca-2,6-diene-1,10-diol 1,10-diacetate and 1-methoxy-11-chloro-3,7,11-trimethyldodeca-2,6-dien-10-ol is used as the starting material to yield 11-methylene-3,7-dimethyldodeca-2,6-diene-1,10-diol, 11-methylene-3,7-dimethyldodeca-2,6-diene-1,10-diol 1-acetate, 11-methylene-3,7-dimethyldodeca-2,6-diene-1,10-diol 1,10-diacetate and 1-methoxy-11-methylene-3,7-dimethyldodeca-2,6-dien-10-ol, respectively.

Likewise, each of 7,11-dichloro-3,7,11-trimethyldodec-2-ene-1,6,10-triol; 7,11-dichloro-3,7,11-trimethyldodec-2-ene-1,6,10-triol 1,6,10-triacetate; 1-methoxy-7,11-dichloro-3,7,11-trimethyldodec-2-ene-6,10-diol; 1-methoxy-7,11-dichloro-3,7,11-trimethyldodec-2-ene-6,10-diol 6,10-diacetate; 1-methoxy-7,11-dichloro-3,7,11-trimethyltridec-2-ene-2,6-dien-10-ol; and 11-chloro-3,7,11-trimethyltrideca-2,6-diene-1,10-diol 1,10-diacetate diacetate is used in the process of Example 10 (Part A) to yield 7,11-bismethylene-3-methyldodec-2-ene-1,6,10-triol; 7,11-bismethylene-3methyldodec-2-ene-1,6,10triol 1,6,10-triacetate; 1-methoxy-7,11-bismethylene-3-methyldodec-2-ene-6,10-diol; 1-methoxy-7,11-bismethylene-3-methyldodec-2-ene-6,10-diol 6,10-diacetate; a mixture containing 1-methoxy-7,11-bismethylene-3-methyltridec-2-ene-6,10-diol and 1-methoxy-7-methylene-3,11-dimethyltrideca-2,11-diene-6,10-diol; a mixture containing 1-methoxy-11-methylene-3,7-dimethyltrideca-2,6-diene-10-ol and 1-methoxy-3,7,11-trimethyltrideca-2,6,11-triene-10-ol; and a mixture containing 11-methylene-3,7-dimethyltri-deca-2,6-diene-1,10-diol 1,10-diacetate and 3,7,11-trimethyl-trideca-2,6,11-triene-1,10-diol 1,10-diacetate, respectively.

The 11-chloro-10-hydroxy, 11-chloro-10-acetoxy, 7,11-dichloro-6,10-dihydroxy and 7,11-dichloro-6,10-diacetoxy compounds are prepared using methods described hereinabove starting with 3,7,11-trimethyldodeca-2,6,10-trien-1-ol or the ester or ether thereof, 3,7,11-trimethyl-trideca-2,6,10-trien-1-ol or the ester or ether thereof, or 3,11-dimethyl-7-ethyltrideca-2,6,10-trien-1-ol or the ester or ether thereof.

EXAMPLE 15

The process of Example 1 is repeated using as the staring material each of N,N-diethyl 11-chloro-10-hydroxy-3,7,11-trimethyldodeca-2,6-dienylamine, N,N-diethyl 11-chloro-10-acetoxy-3,7,11-trimethyldodeca-2,6-dienylamine, N,N-diethyl 7,11-dichloro-6,10-dihydroxy-3,7,11-trimethyldodec-2-enylamine and N,N-diethyl 7,11-dichloro-6,10-diacetoxy-3,7,11-trimethyldodec-2-enylamine to yield N,N-diethyl 11-methylene-10-hydroxy-3,7-dimethyldodeca-2,6-dienylamine, N,N-diethyl 11-methylene-10-acetoxy-3,7-dimethyldodeca-2,6-dienylamine, N,N-diethyl 7,11-bismethylene-6,10-dihydroxy-3-methyldodec-2-enylamine and N,N-diethyl 7,11-bismethylene-6,10-diacetoxy-3-methyldodec-2-enylamine, respectively.

Likewise, other 11-chloro-10-hydroxy-, 11-chloro-10-acetoxy-, 7,11-dichloro-6,10-dihydroxy- and 7,11-dichloro-6,10-diacetoxyamines prepared by methods described hereinabove from 2,6,10-trienylamines can be used in the above process to prepare novel allylic alcohols and allylic acetates.

EXAMPLE 16

The process of Example 1 is repeated using each of diethyl 11-chloro-10-hydroxy-3,7,11-trimethyldodeca-2,6-dienylphosphonate, dimethyl 11-chloro-10-acetoxy-3,7,11-trimethyldodeca-2,6-dienylphosphonate, diethyl 7,11-dichloro-6,10-dihydroxy-3,7,11-trimethyldodec-2-enylphosphonate and diethyl 7,11-dichloro-6,10-diacetoxy-3,7,11-trimethyldodec-2-enylphosphonate as the starting material to yield diethyl 11-methylene-10-hydroxy-3,7-dimethyldodeca-2,6-dienylphosphonate, dimethyl 11-methylene-10-acetoxy-3,7-dimethyldodeca-2,6-dienylphosphonate, diethyl 7,11-bismethylene-6,10-dihydroxy-3-methyldodec-2-enylphosphonate and diethyl 7,11-bis-methylene-6,10-diacetoxy-3-methyldodec-2-enylphosphonate, respectively.

Likewise, other 11-chloro-10-hydroxy-, 11-chloro-10-acetoxy-, 7,11-dichloro-6,10-dihydroxy- and 7,11-dichloro-6,10-diacetoxyphosphonates prepared by methods described hereinabove from 2,6,10-trienylphosphonates can be used in the above process to prepare novel allylic alcohols and allylic acetates.

What is claimed is

1. A compound selected from those of the formula:

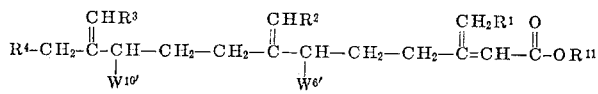

wherein,
each of $R^1$, $R^2$, $R^3$ and $R^4$ is hydrogen or lower alkyl; $R^{11}$ is hydrogen or lower alkyl; and
each of $W^{6'}$ and $W^{10'}$ is hydroxy or acetoxy.

2. A compound according to claim 1 wherein each of $R^1$, $R^2$, $R^3$ is hydrogen and $R^4$ is hydrogen or methyl.

3. A compound according to claim 2 wherein each of $W^{6'}$ and $W^{10'}$ is hydroxy.

4. A compound according to claim 2 wherein each of $W^{6'}$ and $W^{10'}$ is acetoxy.

5. A compound according to claim 3 wherein $R^4$ is hydrogen.

6. A compound according to claim 4 wherein $R^4$ is hydrogen.

7. A compound according to claim 5 wherein $R^{11}$ is methyl or ethyl.

8. A compound according to claim 6 wherein $R^{11}$ is methyl or ethyl.

9. A compound according to claim 3 wherein $R^{11}$ is methyl or ethyl.

10. A compound according to claim 4 wherein $R^{11}$ is methyl or ethyl.

11. A compound selected from those of the formula V and

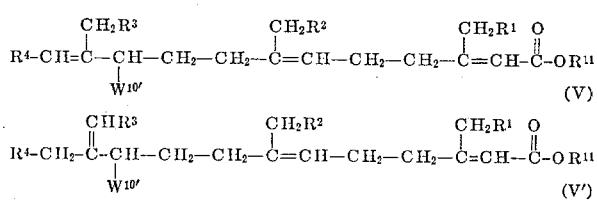

wherein,
each of $R^1$, $R^2$, $R^3$ and $R^4$ is hydrogen or lower alkyl; $R^{11}$ is hydrogen or lower alkyl; and
$W^{10'}$ is hydroxy or acetoxy, provided that when each of $R^1$, $R^2$, $R^3$, $R^{11}$ and $W^{10'}$ are the same in formulas V and V', then $R^4$ in formulas V and V' represent unlike groups.

12. A compound of formula V according to claim 11 wherein each of $R^1$, $R^2$, $R^3$ and $R^4$ is hydrogen.

13. A compound according to claim 12 wherein $R^{11}$ is methyl or ethyl.

14. A compound of formula V according to claim 11 wherein each of $R^1$, $R^2$ and $R^4$ is hydrogen and $R^3$ is methyl.

15. A compound according to claim 14 wherein $R^{11}$ is methyl or ethyl.

16. A compound of formula V according to claim 11 wherein each of $R^1$ and $R^4$ is hydrogen and each of $R^2$ and $R^3$ is methyl.

17. A compound according to claim 16 wherein $R^{11}$ is methyl or ethyl.

18. A compound of formula V' according to claim 11 wherein each of $R^1$, $R^2$ and $R^3$ is hydrogen; $R^4$ is methyl; and $R^{11}$ is hydrogen, methyl or ethyl.

19. A compound of formula V' according to claim 11 wherein each of $R^1$ and $R^3$ is hydrogen; each of $R^2$ and $R^4$ is methyl; and $R^{11}$ is hydrogen, methyl or ethyl.

20. Methyl 3-methyl-7,11-bismethylene-6,10-dihydroxydodec-2-enoate.

21. Methyl 3-methyl-7,11-bismethylene-6,10-diacetoxydodec-2-enoate.

22. Methyl 3,7-dimethyl-11-methylene-10-hydroxydodeca-2,6-dienoate.

23. Methyl 3,7-dimethyl-11-methylene-10-acetoxydodeca-2,6-dienoate.

24. Methyl 3-methyl-7,11-bismethylene-6,10-dihydroxytridec-2-enoate and the 6,10-diacetate thereof.

25. Methyl 3,7-dimethyl-11-methylene-10-hydroxytrideca-2,6-dienoate and the 10-acetate thereof.

* * * * *